United States Patent
Dufaux

Patent Number: 5,943,445
Date of Patent: Aug. 24, 1999

[54] DYNAMIC SPRITES FOR ENCODING VIDEO DATA

[75] Inventor: Frederic A. Dufaux, Boston, Mass.

[73] Assignee: Digital Equipment Corporation, Maynard, Mass.

[21] Appl. No.: 08/769,559

[22] Filed: Dec. 19, 1996

[51] Int. Cl.$^6$ .................................................. G06K 9/00
[52] U.S. Cl. ............................................ 382/236; 382/173
[58] Field of Search ................................ 348/699, 700, 348/208, 416, 113; 358/261.2, 428, 430, 432; 382/100, 190, 215, 107, 236, 282, 283, 106, 171, 173, 174, 180, 181, 192, 195, 197, 199, 201, 202, 203, 204, 207, 209, 210, 217, 224, 225, 232, 235, 238, 239, 240, 241, 242, 243, 244, 248, 251, 308; 701/28, 200; 901/47

[56] References Cited

U.S. PATENT DOCUMENTS

| | | | |
|---|---|---|---|
| 4,639,878 | 1/1987 | Day et al. | 364/516 |
| 4,689,022 | 8/1987 | Peers et al. | 434/307 |
| 4,906,940 | 3/1990 | Greene et al. | 382/100 |
| 4,969,036 | 11/1990 | Bhanu et al. | 358/105 |
| 5,144,149 | 9/1992 | Frosch | 250/493.1 |
| 5,428,387 | 6/1995 | Galt et al. | 348/97 |
| 5,448,053 | 9/1995 | Rhoads | 250/201.9 |
| 5,585,862 | 12/1996 | Wuertele et al. | 348/699 |
| 5,734,441 | 3/1998 | Kondo et al. | 348/700 |

OTHER PUBLICATIONS

Model–based 2D & 3D Dominant Motion Estimation for Mosaicing and Video Representation, Sawhney et al., Int. Conf. on Computer Vision, Cambridge, Mass., Jun. 1995, copyright 1995: IEEE. (See also: ftp://eagle.almaden.ibm.com) (pp. 583–590).

Efficiency Analysis and Application of Uncovered Background Prediction in a Low Bit Rate Image Coder, Dietmar Hepper, IEEE Transactions on Communications, vol. 38, No. 9, Sep. 1990(pp. 1578–1584).

Uncovered Background Prediction in Interfram Coding, Mukawa et al., IEEE Transactions on Communications, vol. COM–33, No. 11, Nov. 1985. pp. 1227–1231.

Salient Video Stills: Content and Context Preserved, Teodosio et al. (MIT Media Lab), Proceedings of the ACM Multimedia Conference, Anaheim, Aug. 1993.(Page number: not specified).

*Primary Examiner*—Leo H. Boudreau
*Assistant Examiner*—Bijan Tadayon

[57] ABSTRACT

Video data representing a scene are processed to improve encoding efficiencies. The video data are segmented into rigidly and non-rigidly moving video objects. The segmentation is preformed by estimating local motion vectors for the video data of a sequence of frames. The local motion vectors are clustered to determine dominant motions, and video data having motion vectors similar to the dominant motions are segmented out as rigidly moving video objects. For these objects, motion parameters are robustly estimated. Using the motion parameters, the rigid video objects of the frames are integrated in one or more corresponding sprites stored in a long-term memory. The sprites can be used in a two-way motion compensated prediction technique for encoding video data where blocks of video data are encoded either from sprites based on rigid motion parameters, or from a previous frame based on local motion parameters. In addition, the sprites can be used to construct a high resolution panoramic view of the background of a scene.

23 Claims, 8 Drawing Sheets

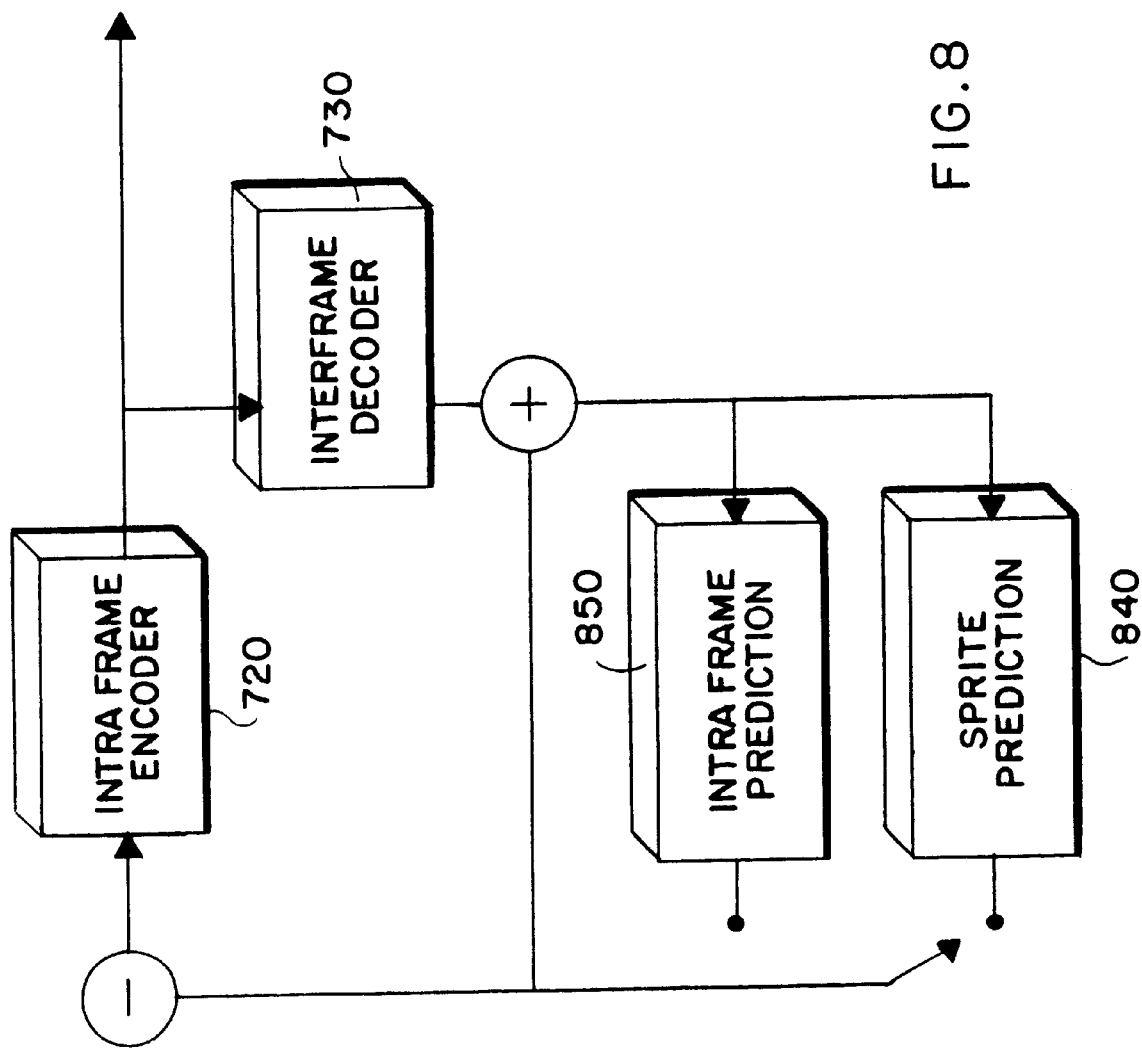

DYNAMIC SPRITES FOR ENCODING VIDEO DATA

FIELD OF THE INVENTION

This invention is related to data processing, and more particularly to processing video data.

BACKGROUND OF THE INVENTION

An observable scene in the real physical world can be represented as temporally and spatially related video data in a memory of a computer system. The video data represent the optical flow of the scene over time and space as varying light intensity values.

Efficient integration and representation of the video data is a key component in video encoding schemes, for example MPEG encoding. Video encoding can reduce the amount of memory used to store the data, as well as reduce the time required to process and communicate the data.

Scenes are generally composed of foreground and background components. Typically, the optical flow of the smaller foreground is in motion with respect to the larger and relatively static background. For example, in a stadium scene, a player or players moves back and forth against the background of the grandstands while the camera pans and zooms following the player. Various parts of the background are revealed as the player moves in the foreground.

One of the more pertinent problems of video encoding deals with encoding uncovered background of scenes. Classical motion compensated prediction schemes are unable to predict newly revealed background areas, and therefore, encoding is inefficient.

To overcome this problem, background memory techniques are known. More precisely, these techniques identify still regions of the scene as background which can be stored in a long-term memory. Whenever a background area is uncovered, and providing that the background area has previously been observed, data unavailable with classical prediction techniques can be retrieved from the background memory.

These techniques are effective for video-conferencing or video-phone sequences which are typically characterized by a still background. However, the model of a static background does not hold true for more complex scenes which include camera motion, e.g., panning or zooming, and multiple moving objects.

In order to integrate temporal information, a mosaic representation, also referred to as a salient still, has been shown to be efficient Basically, these techniques estimate the camera motion using global motion estimation, and align successive images, e.g., frames, in a video sequence by cancelling contributions due to camera motion. A mosaic is built by temporally integrating the aligned frames or images in a memory. In this way, the mosaic captures the information in multiple aligned frames of a video sequence.

However, these techniques are typically applied without distinction between the background and foreground of the scene. That is, the camera motion is only representative of the background motion. Therefore, the foreground appears blurred. Furthermore, as the foreground is integrated into the mosaic representation, the problem of uncovered background remains unsolved. Also, as far as video encoding is concerned, no residual signals are transmitted, leading to noticeable coding artifacts.

Sprites are well-known in the field of computer graphics. Sprites correspond to synthetic video objects which can be animated, and overlaid onto a synthetic or natural scene. For instance, sprites are widely used in video games. More recently, sprites have been proposed for video encoding.

The sprite can either be a synthetic or natural object determined from a sequence of images. In the latter case, the technique is applied to a video object whose motion can be modeled by a rigid body motion. Since the technique is applied to a coherently moving body, instead of the entire frame, some of the problems of frame aligned mosaicking are alleviated.

Generally, these techniques require that the sprite is identified and available before the encoding of a sequence of images begins. The sprite can be encoded using intraframe coding techniques. The encoded sprite can then be transmitted along with rigid body motion information to a decoder. The decoder can warp the sprite using the motion information to render the scene.

In the case of natural scenes, an analysis stage is required prior to encoding in order to build the static sprite. During the analysis, segmentation, global estimation and warping are performed on the video data of the frames. As a result, this method introduces a very significant delay, since a large number of frames needs to analyzed to build the static sprite. For many real-time encoding applications this delay is unacceptable.

Taking the above into consideration, it is desired to provide a method and apparatus which can dynamically build a sprite in a memory. Furthermore, the method should be suitable for real-time video data encoding.

SUMMARY OF THE INVENTION

Disclosed is a software implemented method for dynamically building one or more sprites of a scene. A sprite is defined as a region of the scene, i.e., a video object, where the motion is coherent or rigid. For example, a static background portion of the scene can be moving rigidly due to a camera panning the scene.

Straightforwardly, since the method compensates for the rigid motion of the video objects, it overcomes the shortcomings of classical background memory techniques. Furthermore, since the temporal integration is only performed on rigidly moving objects, the method outperforms classical mosaic representations.

The method includes three main stages. First, a discrimination is made between regions of the scene which have rigid and non-rigid motion. For example, the background can be a rigidly moving object due to camera motion. Similarly, a train moving across the background can be another rigidly moving object. The discrimination is based on local motion information. Second, the parameters which described the rigid motion are estimated for each identified video object. Third, using the rigid motion information, a dynamic sprite is built for each identified video object by progressively integrating data representing the video object in a long-term memory. Each of these stages represents challenging problems, a detailed and efficient solution to which is described in detail below.

Using the disclosed mosaicking technique, permits an efficient integration and representation of motion information. More specifically, a two-way motion compensation prediction is disclosed. A current frame can be predicted either from memory using rigid motion estimates, or from a previous frame using local motion estimates.

Therefore, this method handles, to a large extent, the problem of dealing with uncovered regions of a scene.

Furthermore, the amount of additional information required to represent motion information is greatly reduced due to representing motion in a compact parametric form.

Moreover, these gains are obtained without introducing any encoding delays. The method can be applied independent from any subsequent encoding techniques. In particular, though the method is applicable to classical motion compensated block-DCT encoding schemes, it is also appropriate for object-based representation of a scene. Finally, the method can be used to provide a high resolution panoramic view of background components of scenes.

BRIEF DESCRIPTION OF THE DRAWINGS

The above-mentioned and other features of the invention will now become more apparent by reference to the following description taken in connection with the accompanying drawings in which:

FIG. 8 is a two-way motion prediction technique for video data encoding.

DETAILED DESCRIPTION OF THE PREFERRED EMBODIMENT

System Arrangement

Figure 1:
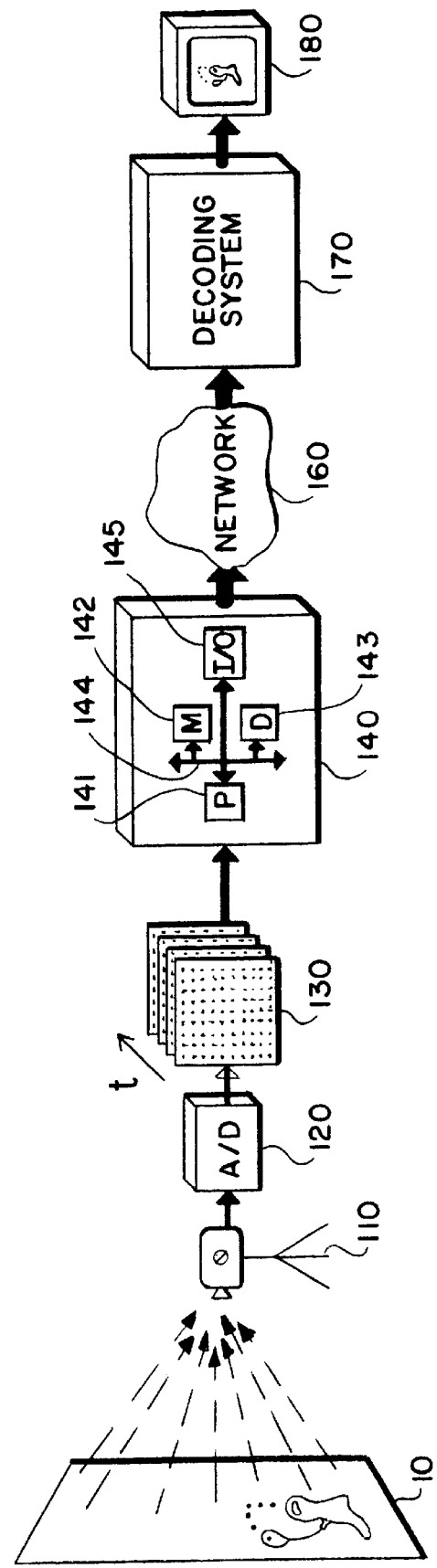
FIG. 1 is an arrangement which uses video processing according to the invention.

FIG. 1 shows an arrangement 100 which uses a method and apparatus for dynamically generating one or more "sprites." Each sprite can be built in real-time as video data are encoded and decoded. The method and apparatus are suitable for low bit rate video data transmission.

The arrangement 100 includes a camera 110 for acquiring light intensity values of a real scene 10 as video data. If the camera 100 is analog, an A/D converter 120 can be used to generate representative digital signals.

In any case, a temporal sequence of images or frames 130 is produced. Each frame includes a plurality of picture elements (pixels) arranged in a regularized pattern. Each pixel represents a light intensity value of part of the scene 10. The frames 130 are presented to a video processing system 140.

The system 140 can be in the form of a modem workstation including one or more processors 141, a first memory (DRAM) 142, and a second memory (DISK) 143, connected to each other by a bus 144. A portion of the memories can be allocated as memory for building the one or more sprites.

The processing system 140 can be connected via a network 160 to a decoding system 170 via an input/output interface (I/O) 145. The decoding system 170 can be connected to a display device 180 for generating reconstructed images of the scene 10. The decoding system can also be in the form of a workstation, or the decoding system can be a set-top box, and the display device can be a television.

In a general sense, the arrangement 100 does nothing more than receive input photons as light intensity values, electronically represent the values as pixels of video data, and process the video data to produce output photons representative of the input.

During operation, the system 140 processes the images to dynamically generate one or more sprites in the memories. Furthermore, the system 140 can encode intraframes and motion information in real-time. The encoded data can be transmitted to the decoder 170 via the network 160 for reconstruction on the display device 180.

Overview of Process

Figure 2:
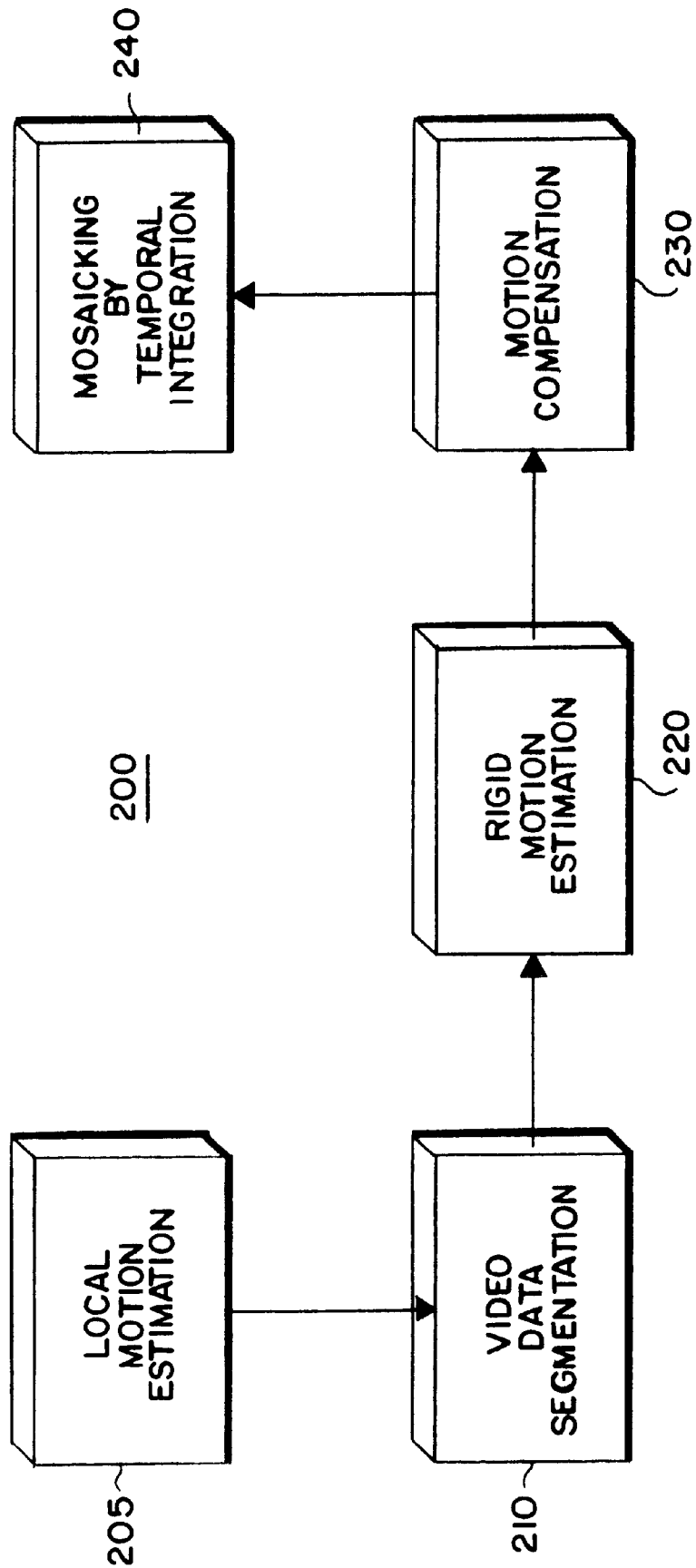
FIG. 2 is a block diagram of a process for dynamically building a sprite.

More specifically as shown in FIG. 2, instructions of programs comprise a computer implemented method 200 for dynamically building one or more sprites representative of portions of the scene 10 without introducing any delays. In step 205, a set of local motion vectors are estimated for each frame of the sequence 130 of FIG. 1.

In step 210, the video data of each frame are segmented into video objects having rigid and non-rigid motion. For example, the static background of a scene may be moving rigidly if the scene is viewed by a panning camera. A train moving across the background may be another rigidly moving object. Similarly, a car speeding to catch up with the train may be another rigidly moving object.

The video data are segmented using the local motion estimation of step 205. In step 220, motion information, e.g., motion parameters, is estimated for the video objects segmented as having rigid motion. The motion parameters are applied to the video data to compensate for, for example, camera motion in step 230. The compensated data can temporally be integrated as one or more dynamic sprites stored in the memories during step 240.

Segmentation

Figure 3:
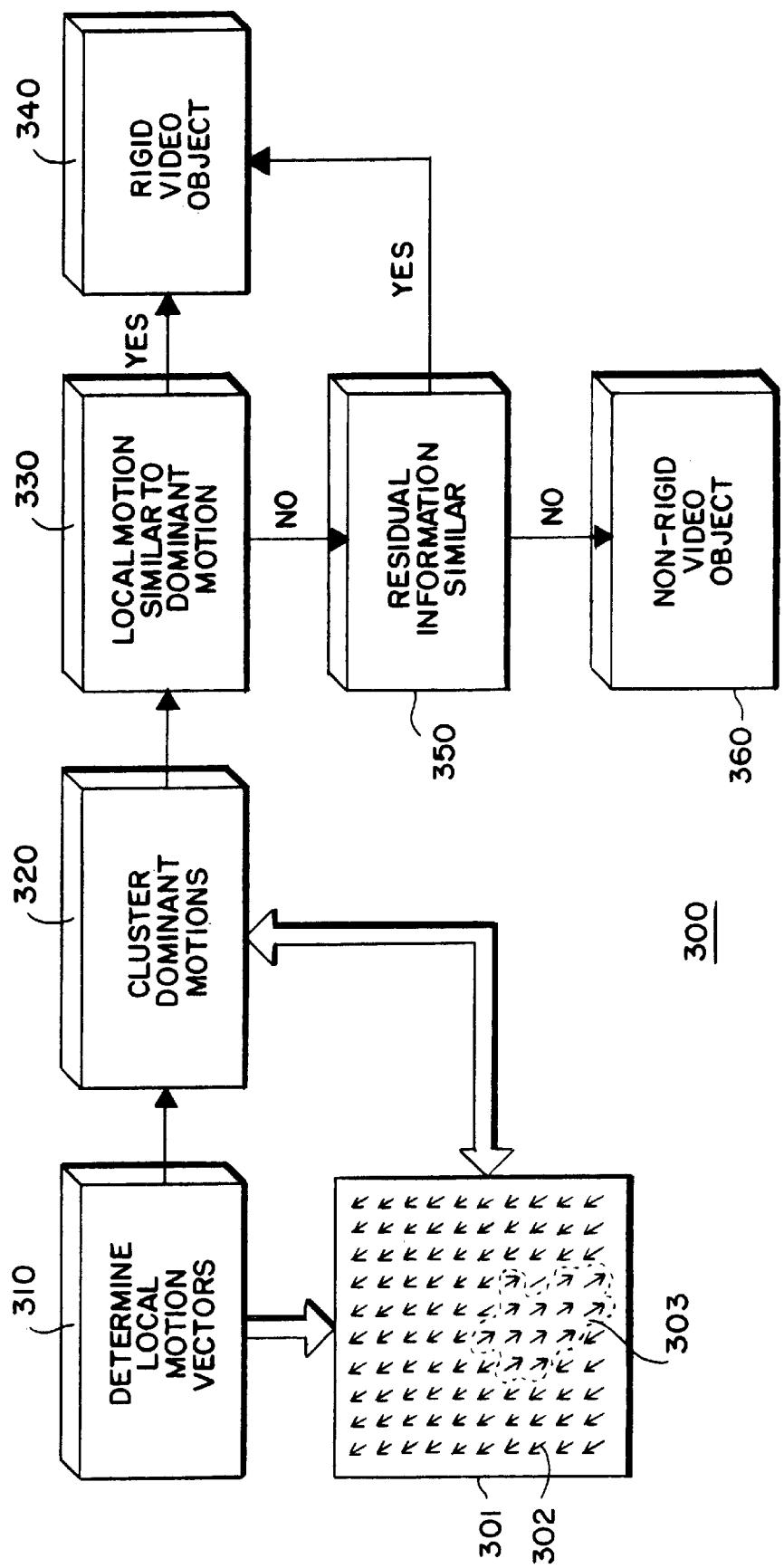
FIG. 3 is flow diagram of a process for segmenting video data into video objects having rigid and non-rigid motion.

FIG. 3 shows a process 300 for segmenting video data representing the scene 10 of FIG. 1 into rigidly and non-rigidly moving video objects. In step 310, a set of local motion vectors 301 are estimated for each frame. There is one motion vector for each pixel. Motion vectors can be determined by comparing pixels of a current frame with corresponding pixels of a previous frame.

The local motion vectors 301 are clustered into subsets of vectors in step 320 to determine one or more dominant motions. In step 330, regions having motion similar to the dominant motions are identified. If a motion vector is similar to one of the dominant motions, the associated pixels are classified in step 340 as belonging to the corresponding rigidly moving video object 302.

However, in low contrast regions, the motion vector estimation is unconstrained, and the local motion vectors are generally unreliable. Therefore, the discrimination based on motion similarity of step 330 may fail. To overcome this difficulty, the residual information present in the predication error during the estimation can be exploited in step 350.

Namely, if the residual information obtained for the dominant motion is similar to the residual information obtained for the local motion vectors, then the region is classified as moving rigidly, and otherwise as moving non-rigidly 303, step 360. In this way, low contrast areas, where motion estimation is unreliable, can robustly be segmented as either rigidly or non-rigidly moving video objects.

Motion Estimation

After segmenting the scene into rigidly and non-rigidly moving video objects, the motion information for the rigidly moving video objects is robustly estimated. Since the non-rigidly moving objects have been segregated out, the estimation of the rigid motion is not spoiled by the presence of outliers due to foreground objects whose motion is not represented by the dominant motions, e.g., the camera motion.

The motion information can be represented by a parametric motion model. For this purpose, two models can generally be used, a six parameter affine model, or a nine (eight of which are independent) perspective model.

The six parameter affine model allows for the representation of the motion of a planar surface under orthographic projection. However, the model assumes that the depth of the scene 10 of FIG. 1 is small when compared with the distance from the scene 10 to the camera.

Therefore, in order to relax this constraint, the nine parameter perspective model is preferred. This model allows for the representation of the motion of a planar surface under perspective projection.

In order to robustly estimate the parameters of the motion information, a matching technique can be used. This technique generally outperforms differential and linear regression techniques. The motion parameters (a1, . . . , a9) are obtained by minimizing a disparity measurement between a region of a current frame and a corresponding region of a previous frame. A search for the minimum is carried out in an n-dimensional parametric space.

To decrease the computational complexity, a fast non-exhaustive search can be carried out where the rigid motion parameters are estimated progressively. First, the translational component is computed, that is, a1 and a4. Then, the affine parameters, a2, a3, a5 and a6, and finally the perspective parameters a7, a8, and a9.

Besides decreasing complexity, this search strategy tends to produce more robust estimates, as the translational component usually carries more information than the other parameters, which often reduce to little more than noise. However, this search strategy obviously induces the risk of being trapped in a local minimum.

Therefore, the matching motion estimation algorithm can be applied on a multiresolution structure based on a Gaussian pyramid. With the Gaussian pyramid, the final motion parameters at one level of the pyramid can be propagated to be an initial estimate for a next level of the pyramid. This multiresolution scheme allows for the reduction of the computational load, as well as the prevention of local minima due to the non-exhaustive search.

Dynamic Sprites

Once the scene has been segmented, and the motion estimated, the video data representing rigidly moving video objects are temporally integrated by mosaicking. There is one sprite for each identified video object. A distinction is made between static and dynamic sprites. A static sprite integrates all motion information of all of the frames in a sequence, e.g., mean, median, weighted mean, and weighted median.

In contrast, a dynamic sprite, as described herein, corresponds to a progressive update of the sprite content by gradually integrating the motion information of selected portions of individual frames, e.g., rigidly moving video objects. Since the static sprite puts more constraints on the video and coding scheme, such as having high encoding delay, and the buffering of many frames, the dynamic sprite is preferred.

Temporal Warping for Pixel Alignment

To build the sprites, the frames are aligned with respect to a coordinate system. The coordinate system can correspond either to a fixed reference, such as the first frame or a preferred view, or to a time-varying reference, for example, the current frame. The selected alignment can depend on the intended use.

For a predictive encoding application, where it is desired to encode a next current frame depending on previous frames, the time-varying reference is preferred. In the case where the goal is to build a panoramic view, the fixed reference can be used.

More formally, the motion parameters between time t−1 and time t are denoted by $A(t-1, t)=(a1, \ldots, a9)$. These parameters define the relationship between pixel coordinates $r=(x, y)$ at time t, and coordinates $r'=(x', y')$ at time t−1.

Figure 4A:
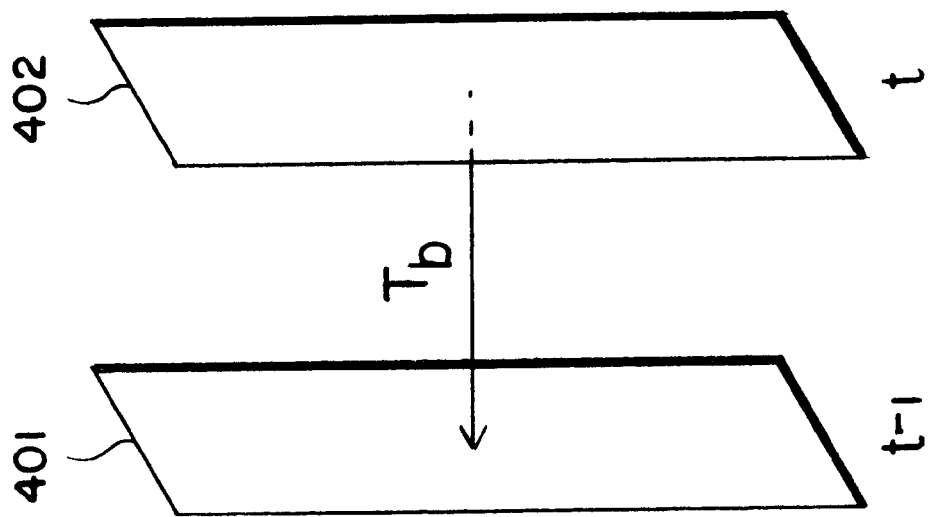
FIGS. 4A and 4B show forward and backward transforms to warp pixel intensity values.
Figure 4B:
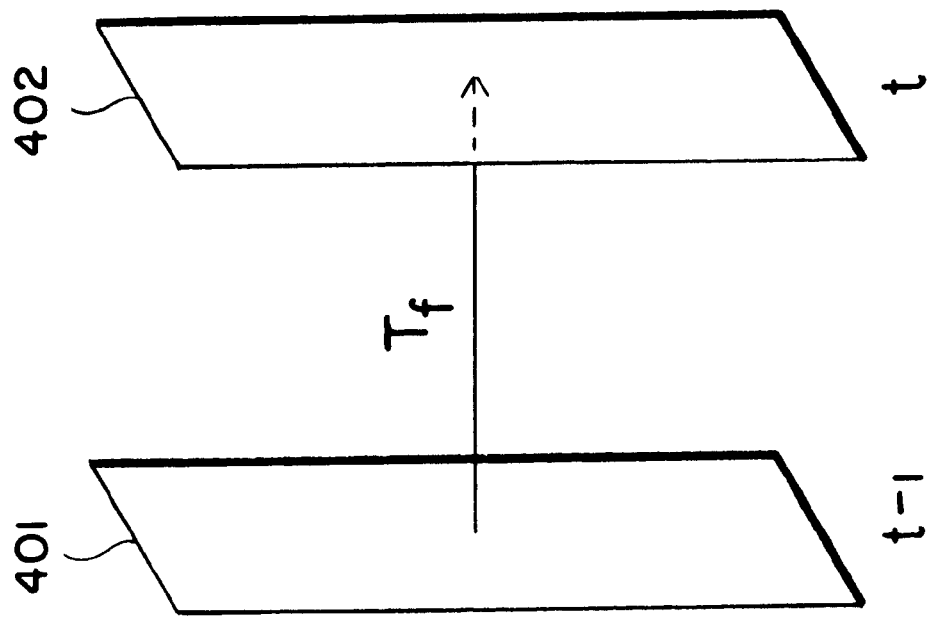

As shown in FIGS. 4a and 4b, a forward transform $T_f$ can warp the pixels of a previous frame 401 at time t−1 to corresponding pixels of a current frame 402 at time t. Similarly, a backward transform $T_b$ can warp the pixels from the current frame 402 to the previous frame 401. Since it is unlikely that the coordinates of the warped pixels will coincide with a selected sampling grid, an interpolation filter can be used to resample the intensity values of the pixels at their new coordinates.

Mosaicking

Figure 5:
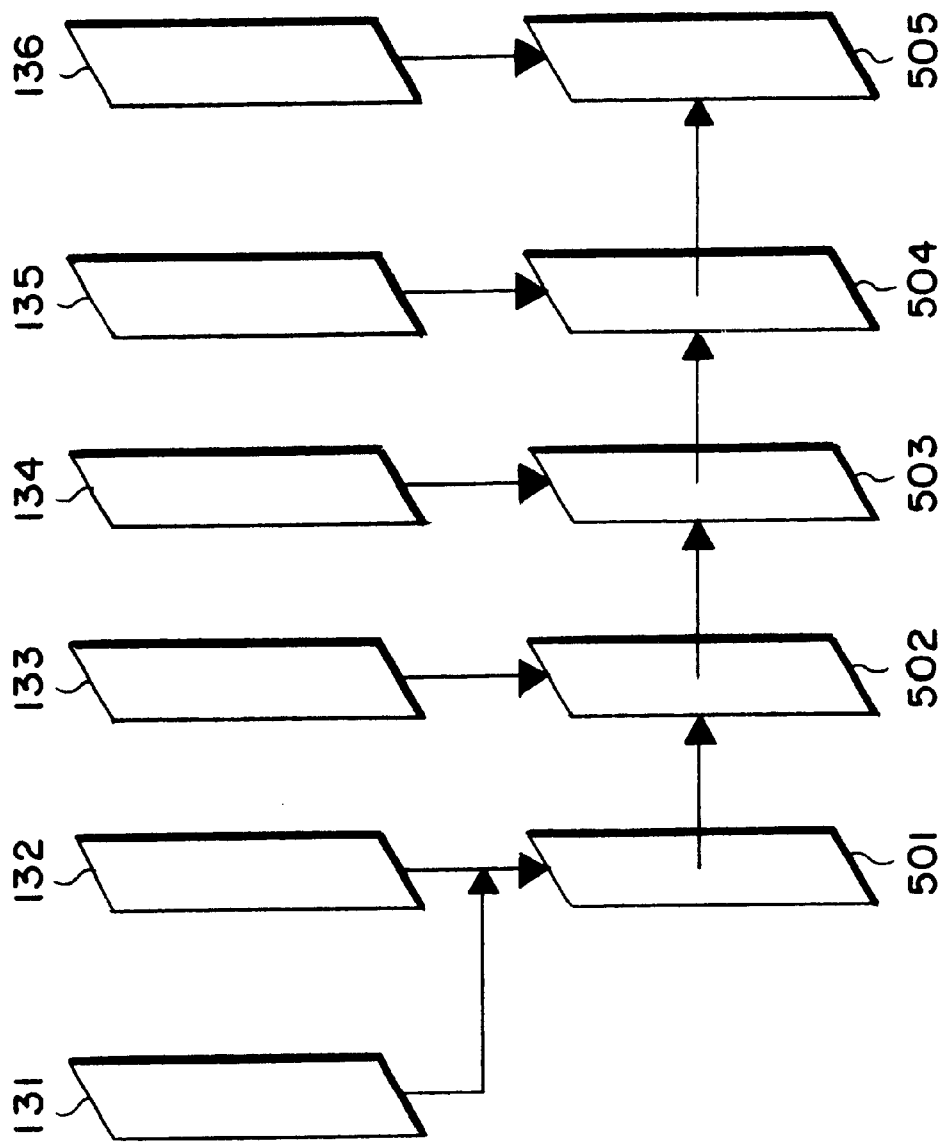
FIG. 5 shows a dynamic integration of a sequence of frames into a sprite.

As shown in FIG. 5, knowing the rigid motion parameters, frames 131–136 of the sequence 130 can be temporally aligned with respect to a coordinate system before being integrated into a dynamically evolving sprite, e.g., 501–505. The coordinate system, as stated above, can correspond to either a fixed reference, e.g., the first frame or a preferred view, or a time-varying reference, e.g., the current frame. The particular frame of reference can be selected on the intended use of the sprite. The latter is preferred for predictive coding, and the former may be preferred where the goal is to build a panoramic view of the scene 10.

Figure 6:
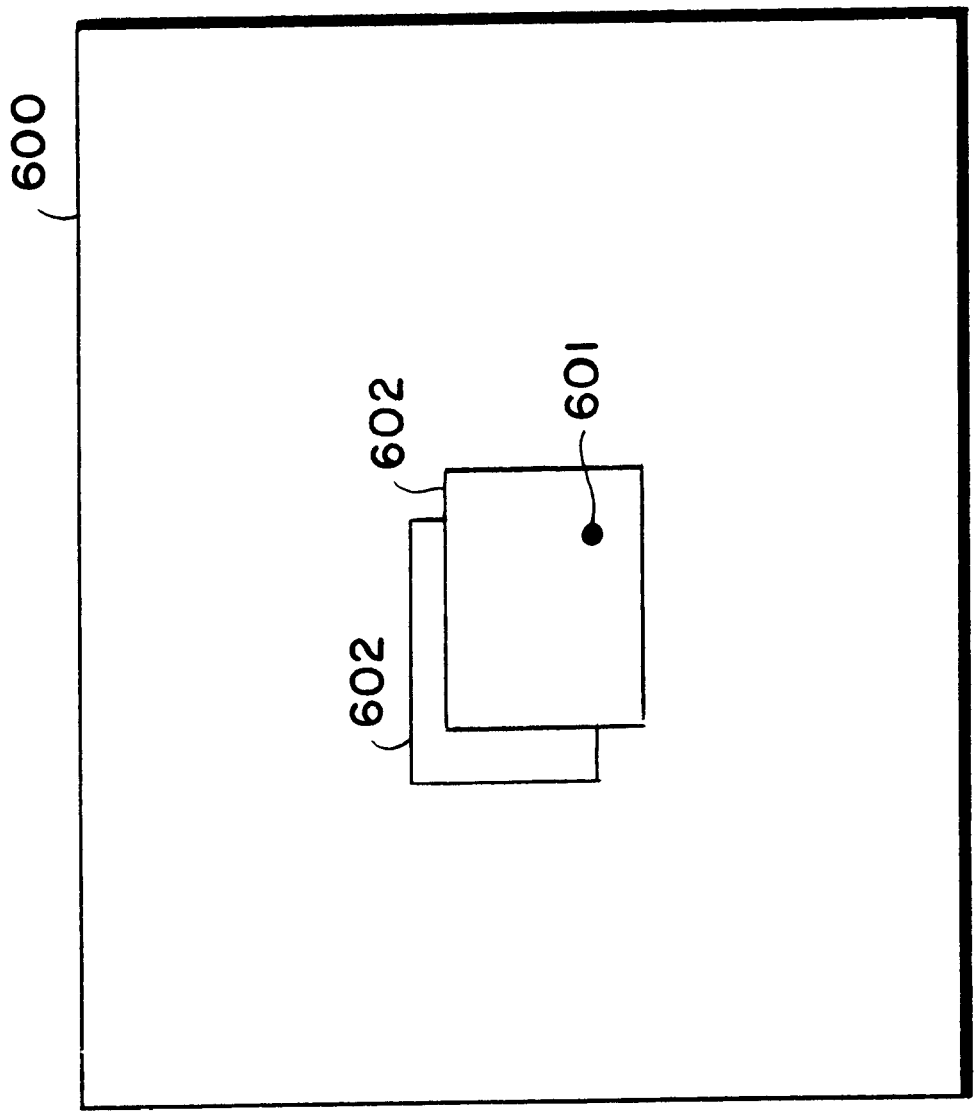
FIG. 6 is a block diagram of the relative sizes of a frame and a dynamic sprite.

FIG. 6 shows a sprite 600 which includes pixel intensity values of a frames 602 in order to generate a panoramic view of a scene. The size of the sprite 600 is significantly larger than the size of the frames 602 which are integrated in order to form the sprite. In the example shown, the rigid motion is downward, and to the right.

The spatial location r of a pixel 601 of one of the frames 602 corresponds to a spatial location R in the sprite 600, where R is a function of r. That is, there is a function f( ) such that $R=f(r)$, and $r=f^{-1}(R)$. For instance, f( ) can be chosen such that the frame being integrated is centered in the sprite 600.

Fixed Reference

First, the case of a fixed reference is considered. For example, the fixed coordinate system of the dynamic sprite corresponds to the first frame at a time $t_0=0$. Alternatively, the fixed reference can correspond to the coordinate system of a preferred view.

Using the backward transform of FIG. 4b, the pixels of a current frame at time t are warped to this fixed reference so that the pixels can be integrated with previously stored pixels of the sprite at time t−1 to generate a new sprite at time t. If no pixels are stored in the memory for the current frame, the pixels of the current frame can be used as initial values for this portion of the sprite.

As stated above, the coordinates of the warped pixels are unlikely to coincide with the chosen sampling grid for the sprite. Therefore, new pixel intensity values are interpolated and normalized as necessary. For a fixed reference, bilinear interpolation is preferred.

Time-Varying Reference

In the case of the time-varying reference, the sprite at time t−1 is warped to the coordinate system of the current frame using the forward transform $T_f$ of FIG. 4a. Then, the current frame can be integrated into the warped sprite to dynamically generate the sprite at time t. As for the fixed reference, if no pixel values exist in the sprite at the coordinates corresponding to the new frame, the current frame is used to initialize the sprite for these coordinates.

In this case also, the coordinates of the warped sprite are unlikely to coincide with the current frame, therefore, interpolation and normalization may be necessary. For the time-varying reference, a $0^{th}$-order interpolation is preferred. Due to the forward warping using the $0^{th}$-th order interpolation, black lines having a width of one pixel may be introduced in the sprite. These lines can be detected by their zero pixel intensity values, and can be re-interpolated from neighboring pixels.

Applications to Video Encoding

Figure 7:
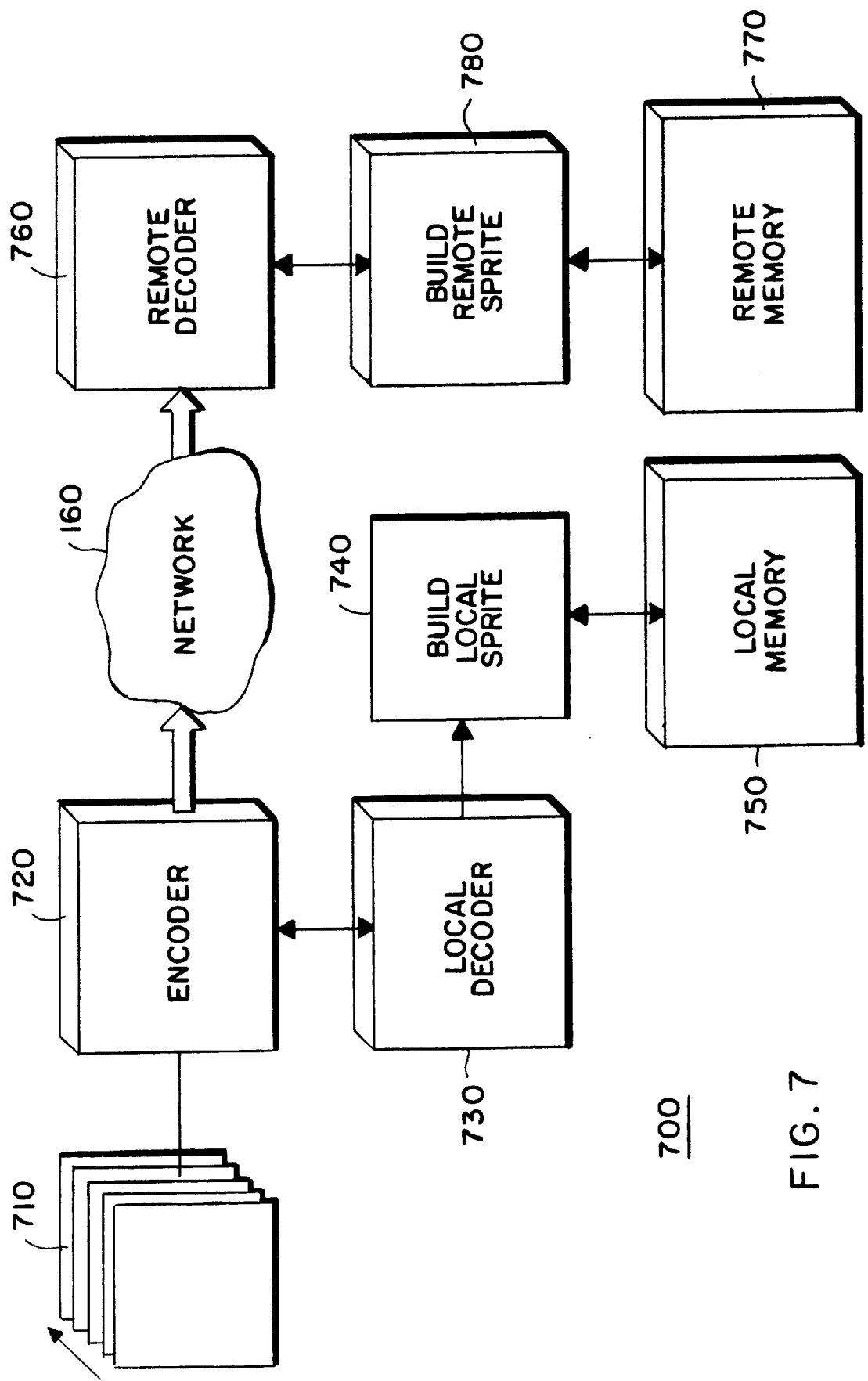
FIG. 7 is a flow diagram of a process for encoding and decoding video data using a dynamic sprite.

FIG. 7 shows a general arrangement 700 of encoder, decoders, and memories to enable video encoding. Frames 710 are encoded by an encoder 720 using, for example, MPEG encoding techniques. The encoded frames include motion information. The frames are decoded by local decoder 730.

A process 740, as described above, dynamically builds one or more local sprites in a local memory 750. The encoded frames and motion information are also transmitted via a network to a remote decoder. The decoded frames, motion information, and shape of the video object are used to build one or more remote sprites in a remote memory 770 using process 780. The steps of processes 740 and 780 are isomorphic.

Since the local and remote sprites are both built from decoded frames, the local and remote frames have the identical lossy characteristics. Therefore, as an advantage, only the rigid motion information, the shape, and the residual error information need to be transmitted in order to construct identical sprites in the local and remote memories.

Two-way Predictive Encoding

As shown in FIG. 8, the sprites stored in the memories enable a two-way motion compensated prediction encoding for video data representing real scenes.

First, in a motion compensated block-DCT (discrete cosine transform) scheme, each block of video data of a frame can predictably be selected in real-time. In a blocking scheme, each frame is partitioned into a plurality of blocks of regularized arrays of pixels, for example, each block is an eight by eight array of pixels.

Each block is selected for encoding either from one of the sprites built in the memory based on rigid motion parameters and sprite prediction 840, or from a previous frame based on local motion parameters and intraframe prediction 850. The multi-way selection is determined by which prediction methodology yields a minimum prediction error, e.g., the sum of the absolute difference between the prediction error for sprite prediction and the intraframe prediction methodologies. The selection can be indicated to the decoder by an identification associated with each block of pixels.

Thus, pixel data representing uncovered rigidly moving regions of a scene can be retrieved from the long-term memory provided that the data have previously been observed. Furthermore, the parametric rigid motion estimation efficiently handles camera motion such as panning and zooming, resulting in reduced motion side information. Finally, the process of integrating many frames into the dynamic sprites also filters the noise in the sequence of frames, leading to a better prediction.

In addition, the sprites stored in the memory can also be used to construct a high resolution panoramic view of the background portion of the scene. With dynamically generated sprites, foreground components of the scene may be entirely eliminated, or only partially observable.

An attached Appendix describes additional details and algorithms which can be used for motion estimation, warping, mosaicking, motion summation, interpolation, and sprite prediction.

Having described a preferred embodiment of the invention, it will now become apparent to one of skill in the art that other embodiments incorporating its concepts may be used. It is felt, therefore, that this invention should not be limited to the disclosed embodiment, but rather should be limited only by the spirit and scope of the appended claims.

APPENDIX

This appendix describes additional details of the method of generating dynamic sprites for video encoding as set out above.

This technique requires three main stages: segmentation of video objects which undergo a coherent rigid motion, parametric global motion estimation, and progressive building of a dynamic sprite for each of the video objects.

1. Rigid Motion Estimation

Rigid motion estimation is performed on each of the video objects by means of a generalized hierarchical parametric matching technique. Basically, the motion parameters $\vec{a} = (a1, \ldots, a9)$ are obtained by minimizing a disparity measure between the video object R at time t and the mapped region at time t−1

$$\min_{\vec{a}} \sum_{\vec{r} \in R} \| I(\vec{r}, t) - I(T(\vec{r}, \vec{a}), t-1) \|,$$

where $I(\vec{r}, t)$ denotes the image intensity at location $\vec{r}$ and time t, $T(\vec{r}, \vec{a})$ is the location to be matched in the previous frame, and 11.11 denotes the distance measure.

2. Warping

The motion parameters between time t−1 and time t are denoted by $\vec{a}(t-1, t) = (a1, \ldots, a9)$. Those parameters define the relation between the pixel coordinates $\vec{r} = (x, y)^T$ at time t and $\vec{r}' = (x', y')^T$ at time t−1 (where the time axis is normalized such as the sampling interval $\Delta t = 1$).

A forward transform $T_f[\ ]$ which gives the pixel $\vec{r} = (x, y)^T$ corresponding to the pixel $\vec{r}' = (x', y')^T$ at time t−1 can be defined as $$\begin{pmatrix} x \\ y \end{pmatrix} = \begin{pmatrix} \dfrac{a1 + a2x' + a3y'}{a7x' + a8y' + a9} \\ \dfrac{a4 + a5x' + a6y'}{a7x' + a8y' + a9} \end{pmatrix},$$

or $$\vec{r} = T_f[\vec{r}', \vec{a}(t-1, t)].$$

Similarly, a backward transform $T_b[\ ]$ which gives the pixel $\vec{r}' = (x', y')^T$ corresponding to the pixel $\vec{r} = (x, y)^T$ at time t can be defined as $$\begin{pmatrix} x' \\ y' \end{pmatrix} = \begin{pmatrix} \dfrac{a3a4 - a1a6 + (a6a9 - a4a8)x + (a1a8 - a3a9)y}{a2a6 - a3a5 + (a5a8 - a6a7)x + (a3a7 - a2a8)y} \\ \dfrac{a1a5 - a2a4 + (a4a7 - a5a9)x + (a2a9 - a1a7)y}{a2a6 - a3a5 + (a5a8 - a6a7)x + (a3a7 - a2a8)y} \end{pmatrix},$$

or $$\vec{r}\,' = T_b[\vec{r}, \vec{a}(t-1)].$$

It can also be noted that the affine model is a particular case of the perspective model where a7=a8=0 and a9=1. For instance, in the affine case the forward transform becomes $$\begin{pmatrix} x \\ y \end{pmatrix} = \begin{pmatrix} a1 + a2x' + a3y' \\ a4 + a5x' + a6y' \end{pmatrix},$$

and the backward transform becomes $$\begin{pmatrix} x' \\ y' \end{pmatrix} = \begin{pmatrix} \frac{a3a4 - a1a6 + a6x - a3y}{a2a6 - a3a5} \\ \frac{a1a5 - a2a4 - a5x + a2y}{a2a6 - a3a5} \end{pmatrix}.$$

3. Dynamic Sprites
3.1 Fixed Reference

First consider the case of a fixed reference corresponding to the first frame at time $t_0=0$. Here, the dynamic sprite is in a fixed coordinate system, and the current frame at time t is warped to this coordinate system to be blended with the sprite at time t−1 in order to generate the new sprite at time t.

More formally, the dynamic sprite is updated as follow. If the sprite exists already at the spatial location $\vec{R}$, then the update is given by $$M(\vec{R},t) = (1-\alpha \cdot \delta(\vec{r})) \cdot M(\vec{R},t-1) + \alpha \cdot \delta(\vec{r}) \cdot W_b[I(\vec{r},t), \vec{a}(t_0,t)],$$

otherwise the sprite at this location $\vec{R}$ is initialized with the current video object (also used to initialize the sprite at time $t_0=0$)

$$M(\vec{R},t) = \delta(\vec{r}) W_b[I(\vec{r},t), \vec{a}(t_0,t)],$$

where $I(\vec{r},t)$ denotes the image intensity at location $\vec{r}$ and time t, $W_b[I, \vec{a}]$ represents the backward warping of image I using motion parameters $\vec{a}$, $M(\vec{R},t)$ denotes the dynamic sprite at location $\vec{R}$ and time t, $\alpha$ is a weighting factor such as $\alpha \in [0,1]$, $\delta(\vec{r})$ is the binary segmentation mask for the video object, i.e. $\delta(\vec{r})=1$ if $\vec{r}$ belongs to the object and 0 otherwise, and $\vec{a}(t_0,t)$ is the global motion over the time period from time to to time t.

The parameter $\alpha$ controls the update of the sprite and can be dynamically adapted.

3.1.1 Summing motion parameters

To compute $\vec{a}(t_0,t)$, the pairwise motion parameters $\vec{a}(t_0,t_1)$, $\vec{a}(t_1,t_2)$, ..., $\vec{a}(t-1,t)$ have to be added. The pairwise addition is done by the following formula which can be iterated to sum the parameters from time t to $t_0$.

If $\vec{a}(t_0,t_1)=(a1,\ldots,a9)$ are the motion parameters between time to and $t_1$, and $\vec{a}(t_1,t_2)=(b1,\ldots,b9)$ are the motion parameters between time $t_1$ and $t_2$, then the motion parameters $\vec{a}(t_0,t_2)=(c1,\ldots,c9)$ between time $t_0$ and $t_2$, are given by c1=b1a9+b2a1+b3a4
c2=b1a7+b2a2+b3a5
c3=b1a8+b2a3+b3a6
c4=b4a9+b5a1+b6a4
c5=b4a7+b5a2+b6a5
c6=b4a8+b5a3+b6a6
c7=b7a2+b8a5+b9a7
c8=b7a3+b8a6+b9a8
c9=b7a1+b8a4+b9a9

3.1.2 Warping and interpolation

The backward warped image $W_b[I(\vec{r},t), \vec{a}(t_0,t)]$ is computed by bilinear interpolation as follow. If the warped pixel is $\vec{r}\,' = T_b[\vec{r}, \vec{a}(t_0,t)]$, and A,B,C,D are the pixels at the grid location. The pixel $\vec{r}$ contributes to the pixels A,B,C,D of the warped image as follow:

A+=(1−dx)·(1−dy)·I($\vec{r}$,t)

B+=(1−dx)·dy·I($\vec{r}$,t),

C+=dx·(1−dy)·I($\vec{r}$,t),

D+=dx·dy·I($\vec{r}$,t), where $d_x$ and $d_y$ correspond to the distance between the warped pixel $\vec{r}\,'$ and the grid location A.

In order to correctly normalized the warp image, the weight of each contribution is stored normA+=(1−dx)·(1−dy)

normB+=(1−dx)·dy normC+=dx·(1−dy), normD+=dx·dy.

The operation is iterated for all the pixel $\vec{r}$ in the image $I(\vec{r},t)$. Finally, the pixels of the warped image (for which a contribution has been made, i.e. norm>0) are normalized as follow A=A/normA, B=B/normB, C=C/normC, D=D/normD.

3.2 Time-varying Reference

The case of a time-varying reference corresponding to the current frame is similar. Now the sprite at time t−1 is warped to the coordinate system of the current frame, and the current frame at time t is then blended with the warped sprite in order to generate the new sprite at time t.

More precisely, the dynamic sprite is updated as follow. If the sprite exists already at the spatial location $\vec{R}$, then the update is given by $$M(\vec{R},t) = (1-\alpha \cdot \delta(\vec{r})) \cdot W_f[M(\vec{R},t-1), \vec{a}(t-1,t)] + \alpha \cdot \delta(\vec{r}) \cdot I(\vec{r},t),$$

otherwise the sprite at this location $\vec{R}$ is initialized with the current video object (also used to initialize the sprite at time $t_0=0$)

$$M(\vec{R},t) = \delta(\vec{r}) I(\vec{r},t),$$

where $W_f[M, \vec{a}]$ represents the forward warping of sprite M using motion parameters $\vec{a}$.

The parameter α controls the update of the sprite and can be dynamically adapted.

3.2.1 Warping and interpolation

The forward warped sprite $W_f[M(\vec{R},t-1), \vec{a}(t-1,t)]$ is computed by 0th-order interpolation as follow. If the warped pixel is $\vec{R}'=T_f[\vec{R}, \vec{a}(t-1,t)]$. The pixel $\vec{R}$ contributes only to the pixel closest to $\vec{R}'$, e.g.:

A+=M($\vec{R}$,t-1),
B+=0,
C+=0,
D+=0.

In order to correctly normalized the warp image, the weight of each contribution is stored normA+=1,
normB+=0
normC+=0
normD+=0.

The operation is iterated for all the pixel $\vec{R}$ in the sprite M($\vec{R}$, t).

Finally, the pixels of the warped sprite (for which a contribution has been made, i.e. norm>0) are normalized as follow A=A/normA,
B=B/normB,
C=C/normC,
D=D/normD.

4. Video Coding using Dynamic Sprites
4.1 Sprite Prediction

The sprite prediction is obtained by backward prediction.

The prediction $\tilde{I}(\vec{r},t)$ of the image $I(\vec{r},t)$ is given in the case of a fixed reference sprite by $$\tilde{I}(\vec{r},t)=W_b[M(\vec{R},t),\vec{a}(t_0,t)],$$

and in the case of a time-varying reference by $$\tilde{I}(\vec{r},t)=W_b[M(\vec{R},t),\vec{a}(t-1,t)].$$

At this stage a bilinear interpolation is always used.

What I claim is:

1. A computer implemented method for processing video data representing a scene, comprising the steps of:
    segmenting the video data into rigidly and non-rigidly moving video objects;
    estimating motion information for the rigidly moving objects; and
    integrating the rigidly moving objects, using the motion information, incrementally into corresponding dynamic sprites stored in memory.

2. The method of claim 1 further comprising:
    estimating local motion vectors for the video data;
    clustering the local motion vectors to determine dominant motions; and
    segmenting the video data having local motion vectors substantially similar to the dominant motions as the rigidly moving video objects.

3. The method of claim 2 further comprising:
    determining first residual information present in a prediction error of the dominant motions;
    determining second residual information present in a prediction error of the local motion vectors;
    segmenting the video data as the rigidly moving video objects if the first residual information are substantially similar to the second residual information, otherwise, segmenting the video data as non-rigidly moving video objects.

4. The method of claim 1 further comprising:
    estimating the dominant motions using a parametric motion model.

5. The method of claim 4 wherein the parametric motion model is a perspective motion model.

6. The method of claim 2 wherein there is one video object and a corresponding sprite for each dominant motion.

7. The method of claim 1 wherein the video data are organized as a temporal sequence of frames, and further comprising:
    aligning the frames with respect to a coordinate system.

8. The method of claim 7 further comprising:
    aligning the frames with respect to a first frame of the temporal sequence of frames to establish a fixed reference coordinate system for the sprites.

9. The method of claim 8 wherein each frame and each sprite includes a plurality of pixels, each pixel representing a light intensity value of the scene, and further comprising:
    warping pixels of a current frame of the temporal sequence of frames to the fixed reference coordinate system of the sprites using a backward transform prior to integrating.

10. The method of claim 7 further comprising:
    aligning the sprites with respect to a current frame of the temporal sequence of frames to establish a time-varying coordinate system for the sprites.

11. The method of claim 10 wherein each frame and each sprite includes a plurality of pixels, each pixel representing a light intensity value of the scene, and further comprising:
    warping pixels of the, sprites to a current frame of the temporal sequence of frames using a forward transform prior to integrating.

12. The method of claim 1 further comprising:
    encoding the video data, and motion and shape information as encoded data using an encoder of a first processing system;
    decoding the encoded data using a first decoder to build a first sprite in a first memory of the first processing system;
    transmitting the encoded data to a second processing system;
    decoding the encoded data using a second decoder to build a second sprite in a second memory of the second processing system, the first and second sprites being substantially identical.

13. The method of claim 12 wherein the video data are organized as a temporal sequence of frames, and each frame includes a plurality of block of pixels, and further comprising:
    selecting a particular block of pixels of a current frame of the temporal sequence of frames for encoding from the first sprite or from a previous frame of the temporal sequence of frames.

14. The method of claim 13 further comprising:
    encoding the particular block using the motion information if the particular block is selected for encoding from the first sprite; and
    encoding the particular block using the local motion vectors if the particular block is selected for encoding from the previous frame.

15. The method of claim 13 further comprising:

determining a first prediction error for the particular block based on encoding the particular block from the first sprite;

determining a second prediction error for the particular block based on encoding the particular block from the previous frame; and selecting the particular block for encoding from the first sprite if the first prediction error is less than the second prediction error, otherwise selecting the particular block for encoding from the previous frame.

16. The method of claim 8 further comprising:

selecting one of the sprites having the fixed reference coordinate system to construct a panoramic view of a background portion of the scene represented by the video data, the panoramic view only including rigidly moving video objects.

17. An apparatus for processing video data representing a scene, comprising:

a camera acquiring video data representing light intensity values of a scene;

means for segmenting the video data into rigidly and non-rigidly moving video objects;

means for estimating motion information for the rigidly moving objects; and a memory incrementally storing an integration of the rigidly moving objects as dynamic sprites.

18. A computer-implemented method for processing video data representing a scene comprising the steps of:

segmenting the video data into rigidly and non-rigidly moving video objects;

estimating motion information for the rigidly moving objects;

integrating the rigidly moving objects, using the motion information into at least one corresponding sprite in a memory;

wherein the video data are organized as a temporal sequence of frames, each frame includes a plurality of blocks of pixels, and a particular block of pixels of a first of the temporal sequence of frames is selected for encoding from one of the sprite and a second of the temporal sequence of frames which occurs prior to the first of the temporal sequence of frames.

19. The method of claim 18, wherein, if the particular block of pixels is selected from the sprite, the encoding uses the motion information and, if the particular block is selected from the second of the temporal sequence of frames, the encoding uses other motion information different than the motion information.

20. An apparatus for processing video data representing a scene comprising:

a processor configured to receive the video data, to segment the video data into rigidly and non-rigidly moving objects, and to estimate motion information for the rigidly moving objects;

a memory configured to incrementally store an integration of the rigidly moving objects as at least one dynamic sprite; and an encoder configured to encode the video data using the at least one dynamic sprite.

21. The apparatus of claim 20, wherein the processor is further configured to organize the video data as a temporal sequence of frames, each frame including a plurality of blocks of pixels, and to select a particular block of pixels of a first of the temporal sequence of frames for the encoder to encode from one of the at least one sprite and a second of the temporal sequence of frames which occurs prior to the first frame.

22. A computer-implemented method for processing video data representing a scene comprising the steps of:

estimating motion information for a rigidly moving object within the scene; and building at least one dynamic sprite by incrementally integrating the rigidly moving object using the motion information.

23. The method of claim 22, further comprising the step of:

encoding the video data using the at least one sprite.

* * * * *